(12) United States Patent
Ahn et al.

(10) Patent No.: US 9,210,406 B2
(45) Date of Patent: Dec. 8, 2015

(54) APPARATUS AND METHOD FOR CONVERTING 2D CONTENT INTO 3D CONTENT

(75) Inventors: Won-seok Ahn, Yongin-si (KR); Seung-hoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 531 days.

(21) Appl. No.: 13/594,414

(22) Filed: Aug. 24, 2012

(65) Prior Publication Data

US 2013/0057648 A1 Mar. 7, 2013

(30) Foreign Application Priority Data

Sep. 5, 2011 (KR) ........................ 10-2011-0089456

(51) Int. Cl.
*G06K 9/00* (2006.01)
*H04N 13/02* (2006.01)

(52) U.S. Cl.
CPC .................................. *H04N 13/026* (2013.01)

(58) Field of Classification Search
None
See application file for complete search history.

(56) References Cited

U.S. PATENT DOCUMENTS

| | | | | |
|---|---|---|---|---|
| 5,953,439 | A * | 9/1999 | Ishihara et al. | 382/107 |
| 6,031,564 | A * | 2/2000 | Ma et al. | 348/43 |
| 6,477,267 | B1 * | 11/2002 | Richards | 382/154 |
| 7,760,956 | B2 * | 7/2010 | Lin et al. | 382/254 |
| 7,778,469 | B2 * | 8/2010 | Cooper et al. | 382/225 |
| 7,907,793 | B1 * | 3/2011 | Sandrew | 382/284 |
| 8,730,232 | B2 * | 5/2014 | Passmore | 345/419 |
| 2004/0024780 | A1 * | 2/2004 | Agnihotri et al. | 707/104.1 |
| 2004/0181545 | A1 * | 9/2004 | Deng et al. | 707/103 R |
| 2005/0104879 | A1 * | 5/2005 | Kaye et al. | 345/419 |
| 2007/0171220 | A1 * | 7/2007 | Kriveshko | 345/419 |
| 2008/0247670 | A1 * | 10/2008 | Tam et al. | 382/298 |
| 2008/0259073 | A1 * | 10/2008 | Lowe et al. | 345/419 |
| 2009/0116732 | A1 * | 5/2009 | Zhou et al. | 382/154 |
| 2010/0194856 | A1 * | 8/2010 | Varekamp | 348/42 |
| 2012/0063681 | A1 * | 3/2012 | Sandrew et al. | 382/167 |
| 2012/0176379 | A1 * | 7/2012 | Farrer et al. | 345/420 |
| 2012/0235988 | A1 * | 9/2012 | Karafin et al. | 345/419 |
| 2012/0242794 | A1 * | 9/2012 | Park et al. | 348/46 |

OTHER PUBLICATIONS

Chenglei Wu et al., "A Novel Method for Semi-Automatic 2D to 3D Video Conversion", Broadband Networks & Digital Media Laboratory, Department of Automation, Tsinghua University, 3D TV-CON'08, May 28-30, 2008, Istanbul, Turkey, pp. 65-68.

(Continued)

*Primary Examiner* — Wenpeng Chen
(74) *Attorney, Agent, or Firm* — Sughrue Mion, PLLC

(57) ABSTRACT

Disclosed are an apparatus and method for converting video contents, each of which converts 2D contents into 3D contents. The method includes: determining an object to be extracted from a plurality of frames which contain 2D contents; determining a respective possession degree of information about the object to be extracted, with regard to each of the plurality of frames; selecting at least one key frame from among the plurality of frames in accordance with the determined possession degrees of information about the object to be extracted; extracting an object with regard to the selected key frame; assigning depth for conversion into 3D contents to the object to be extracted; and performing tracking upon all but the key frame from among the plurality of frames. Accordingly, the 2D-3D conversion can be performed with high accuracy and reliability.

13 Claims, 6 Drawing Sheets

(56) References Cited

OTHER PUBLICATIONS

Communication dated Nov. 21, 2013, issued by the European Patent Office in counterpart European Application No. 12173656.5.

Xun Cao et al., "Converting 2D Video to 3D: An Efficient Path to a 3D Experience", IEEE Multimedia, vol. 18, No. 4, Apr. 1, 2011, pp. 12-17, XP011378369.

* cited by examiner

APPARATUS AND METHOD FOR CONVERTING 2D CONTENT INTO 3D CONTENT

CROSS-REFERENCE TO RELATED APPLICATION

This application claims priority from Korean Patent Application No. 10-2011-0089456, filed on Sep. 5, 2011 in the Korean Intellectual Property Office, the disclosure of which is incorporated herein by reference in its entirety.

BACKGROUND

1. Field

Apparatuses and methods consistent with the exemplary embodiments relate to an apparatus and method for converting contents, and more particularly to an apparatus and method of converting two-dimensional (2D) contents into three-dimensional (3D) contents.

2. Description of the Related Art

Video content, such as, for example, films, a drama, sports games, etc., (hereinafter, referred to as a "content") is reproduced by a display apparatus having a content play function, such as, for example, a television (TV), a personal computer (PC), a smart phone, a smart pad, a portable multimedia player (PMP), a MP3 player, etc. With the recent development of 3D image display technology, such contents are produced as 3D contents and reproduced by the display apparatus, which is capable of displaying a 3D image.

To reduce time, costs, etc. taken in producing such 3D contents, there has been proposed technology of acquiring 3D contents by applying a predetermined conversion technology to 2D contents.

However, when converting the 2D contents into the 3D contents, real 3D properties of an object, such as, for example, depth and the like, are estimated by a predetermined method, and therefore high accuracy and reliability are required in light of the conversion technology.

SUMMARY

Accordingly, one or more exemplary embodiments provide an apparatus and method for converting 2D contents into 3D contents with higher accuracy and reliability.

One or more exemplary embodiments provide an apparatus and method for converting contents, including a selection of a key frame which is optimal for performing tracking of a plurality of frames with higher accuracy and reliability.

The foregoing and/or other aspects may be achieved by providing a method of converting two-dimensional (2D) video contents into three-dimensional (3D) video contents by using a content converting apparatus. The method includes: determining an object to be extracted from a plurality of frames which include 2D contents; determining, for each of the plurality of frames, a respective possession degree of information about the object to be extracted; selecting at least one key frame from among the plurality of frames based on the determined possession degrees of information about the object to be extracted; extracting the object from the selected at least one key frame; assigning a depth for conversion into 3D contents to the extracted object; and performing tracking upon all of the plurality of frames except for the selected at least one key frame.

The determining of the object to be extracted may include determining the object to be extracted from each scene included in the 2D contents.

The determining of the respective possession degree of information may include determining the respective possession degree of information about the object to be extracted based on a shape of the object contained in the corresponding frame.

The determining of the respective possession degree of information may include determining the respective possession degree of information to vary with a degree of completeness of the shape of the object contained in the corresponding frame.

The determining of the respective possession degree of information may include determining the respective possession degree of information to vary with a size of the shape of the object contained in the corresponding frame.

The determining of the respective possession degree of information may include determining the respective possession degree of information to vary both with a degree of completeness of the shape of the object contained in the corresponding frame and with a size of the shape of the object contained in the corresponding frame. An amount of the variation relating to the degree of completeness of the shape of the object may be greater than an amount of the variation relating to the size of the shape of the object.

The performing of the tracking may include performing the tracking bidirectionally using a previous frame and a subsequent frame with respect to a corresponding frame.

Another aspect may be achieved by providing an apparatus for converting two-dimensional (2D) video contents into three-dimensional (3D) video contents. The apparatus includes: a converter which: determines an object to be extracted from a plurality of frames which include 2D contents; determines, for each of the plurality of frames, a respective possession degree of information about the object to be extracted; selects at least one key frame from among the plurality of frames based on the determined possession degrees of information about the object to be extracted; extracts the object from the selected at least one key frame; assigns a depth for conversion into 3D contents to the extracted object; and performs tracking upon all of the plurality of frames except for the selected at least one key frame.

The converter may determine the object to be extracted from each scene included in the 2D contents.

The converter may determine the respective possession degree of information about the object to be extracted based on a shape of the object contained in the corresponding frame.

The converter may determine the respective possession degree of information to vary with a degree of completeness of the shape of the object contained in the corresponding frame.

The converter may determine the respective possession degree of information to vary with a size of the shape of the object contained in the corresponding frame.

The converter may determine the respective possession degree of information to vary both with a degree of completeness of the shape of the object contained in the corresponding frame and with a size of the shape of the object contained in the corresponding frame. An amount of the variation relating to the degree of completeness of the shape of the object may be greater than an amount of the variation relating to the size of the shape of the object.

The converter may perform the tracking bidirectionally using a previous frame and a subsequent frame with respect to a corresponding frame.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
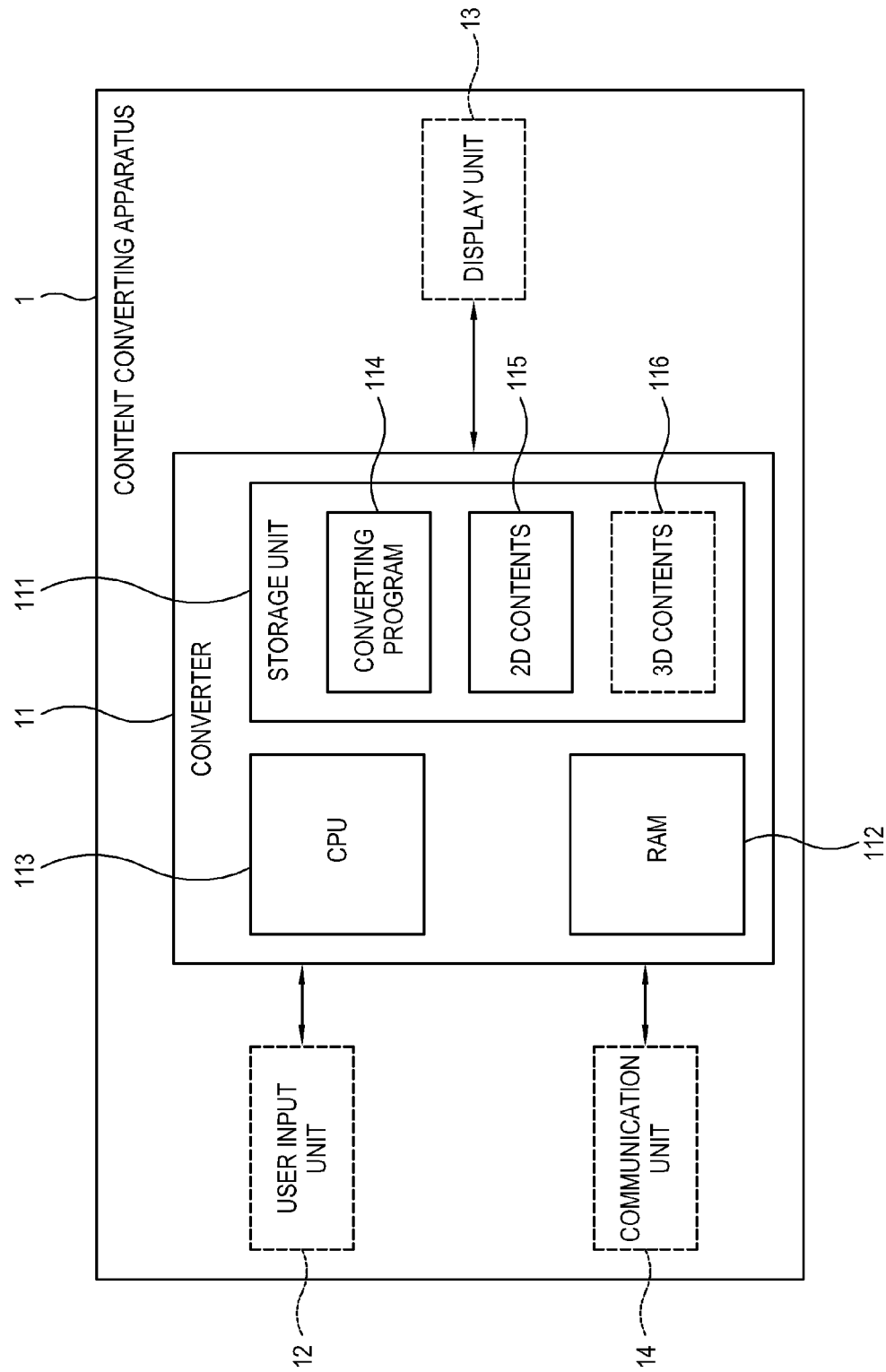
FIG. 1 shows a configuration of a content converting apparatus according to an exemplary embodiment.

Below, exemplary embodiments will be described in detail with reference to accompanying drawings. FIG. 1 shows a configuration of a content converting apparatus according to an exemplary embodiment. The content converting apparatus 1 converts 2D video contents into 3D video contents. In this exemplary embodiment, the contents include moving picture contents, such as, for example, one or more of a film, a drama, a sports contest, etc.

The content converting apparatus 1 may receive the 2D contents to be converted into the 3D contents from a predetermined 2D content providing apparatus (not shown). The content converting apparatus 1 may receive the 2D contents from the 2D content providing apparatus through a predetermined network (not shown). The 2D content providing apparatus may be, for example, a network server which stores the 2D contents and provides the 2D contents to the content converting apparatus 1 upon request from the content converting apparatus 1.

Alternatively, the content converting apparatus 1 may receive the 2D contents from the 2D content providing apparatus through a data transmitting means other than the network. For example, in one exemplary embodiment, the 2D content providing apparatus includes a storage means, such as, for example, one or more of a hard disk drive, a flash memory, etc. for storing the 2D content, and is connected as a local device to the content converting apparatus 1, thereby transmitting the 2D contents to the content converting apparatus 1 upon request from the content converting apparatus 1. In this case, there is no limit to a local connection method between the content converting apparatus 1 and the 2D content providing apparatus, provided that the local connection method allows for data transmission of 2D contents. For example, the local connection method may include using a communication connection with a universal serial bus (USB), or the like.

Alternatively, the content converting apparatus 1 may receive the 2D contents from a 3D content providing apparatus (not shown). For example, in another exemplary embodiment, the 3D content providing apparatus transmits the 2D contents to the content converting apparatus 1 and receives the 3D contents converted by the content converting apparatus 1, thereby providing the 3D contents to a predetermined user terminal (not shown). The user terminal may be, for example, a television (TV), a personal computer (PC), a smart phone, a smart pad, a portable multimedia player (PMP), an MP3 player, or any suitable type of user terminal having a function of displaying the 3D contents received from the content converting apparatus 1 as a 3D stereoscopic image.

Alternatively, the content converting apparatus 1 may transmit the converted 3D contents to a user terminal which has a function of displaying the 3D contents as a 3D stereoscopic image. For example, in another exemplary embodiment, the content converting apparatus 1 may provide the 3D contents to the user terminal through the network.

In this exemplary embodiment, there is no limit upon a method or type of network communication to be used. For example, the network communication may include wired communication and/or wireless communication, etc. provided that the method or type of network communication being used allows for data communication for transmitting the 2D contents and/or the 3D contents. Further, the network communication may include any or all of the known methods and/or types of communication.

As shown in FIG. 1, the content converting apparatus 1 includes a converter 11 and a communication unit 14. The converter 11 converts 2D contents into 3D contents. The 2D contents may include, for example, a plurality of video frames (hereinafter, referred to as a "frame"). The 3D contents, which utilize the phenomenon of a viewer's binocular parallax, may include a plurality of left-eye frames and a plurality of right-eye frames. In particular, a respective frame from among the plurality of video frames which include 2D contents may be converted into a corresponding pair of video frames which include 3D contents, including a left-eye frame and a corresponding right-eye frame. The conversion from the 2D contents into the 3D contents (hereinafter, referred to as "2D-3D conversion") performed by the converter 11 will be further described below.

The communication unit 14 may perform, for example, data communication between the 2D content providing apparatus and the content converting apparatus 1, data communication between the 3D content providing apparatus and the content converting apparatus 1, or data communication between the user terminal and the content converting apparatus 1.

The converter 11 may include a storage unit 111, a random access memory (RAM) 112, and a central processing unit (CPU) 113. The storage unit 111 may store a converting program 114 for implementing the 2D-3D conversion, 2D contents 115 to be converted, and 3D contents 116 converted from the 2D contents. The storage unit 111 may be embodied by a non-volatile memory, such as, for example, one or more of a hard disk drive, a flash memory, etc. The RAM 112 stores at least a part of the converting program 114 when the converter 11 operates, and the CPU 113 executes the converting program 114 stored in the RAM 112. The converting program 114 includes instructions which are executable by the CPU 113. The storage unit 111 is an example of a computer readable recording medium.

Figure 2:
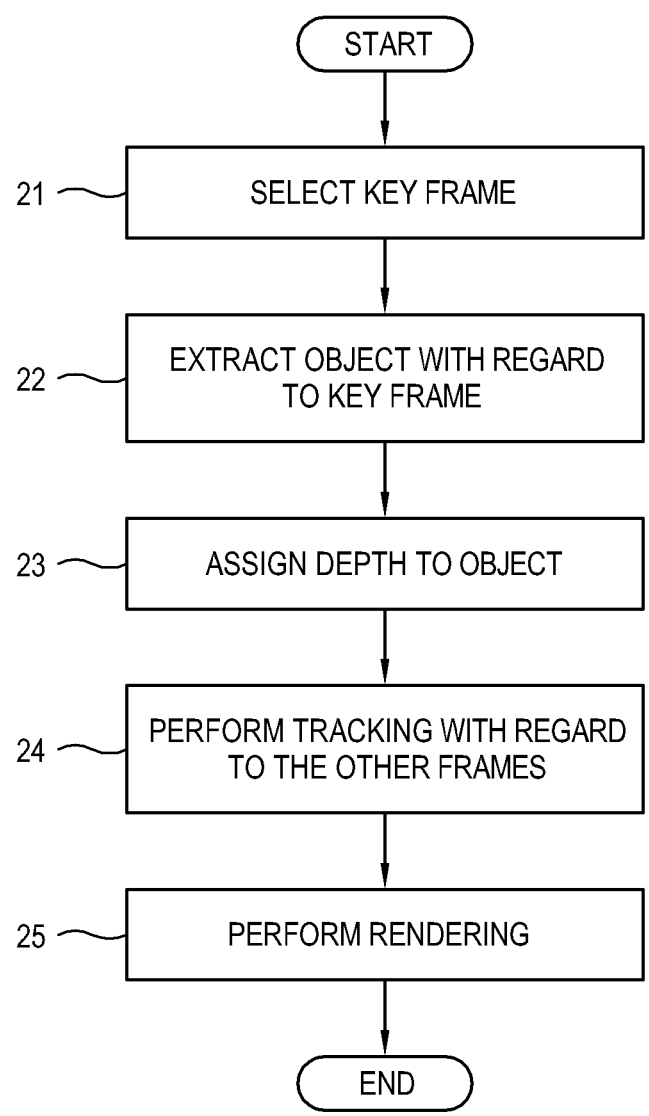
FIG. 2 is a flowchart showing operations of the content converting apparatus of FIG. 1.

FIG. 2 is a flowchart showing operations of the content converting apparatus 1 of FIG. 1, according to an exemplary embodiment. As shown in FIG. 2, operations (hereinafter, referred to as "2D-3D conversion process") of the content converting apparatus 1 correspond to a content converting method implemented by commands of the converting program 114. In this exemplary embodiment, the 2D-3D conversion process includes selecting a key frame at operation 21, extracting an object at operation 22, assigning depth to the object at operation 23, tracking at operation 24, and rendering at operation 25.

First, in the operation 21 of selecting the key frame, an arbitrary key frame is selected from among the plurality of frames which include the 2D contents. Among the plurality of frames which include the 2D contents, a frame capable of maximizing accuracy and reliability of the 2D-3D conversion may be selected as the key frame. The selection of the key frame will be further described below.

Referring back to FIG. 2, in the operation 22 of extracting the object, an object on which a 3D effect will be implemented is extracted with respect to the selected key frame. The extracted object generally corresponds to a major image contained in a scene of each frame. For example, the object may correspond to an image of a main character in a scene where the main character appears, or an image of a vehicle in a scene where the vehicle is running, etc. In the operation 22 of extracting the object, an image contained in the corresponding frame is segmented so that a boundary of the corresponding object can be extracted from the segmentation results.

In the operation 23 of assigning a depth, the depth is assigned to the object extracted in the operation 22 of extracting the object. The depth is a parameter for creating a 3D visual effect, which is used for shifting the objects corresponding to the generated left-eye and right-eye frames in left and right directions, respectively, based on a value of the assigned parameter. In the operation 23 of assigning the depth, a previously provided template may be used for assigning the depth.

In the operation 24 of tracking, the depth is assigned to the objects extracted from all but the key frame. The tracking operation 24 may be implemented with respect to the object extracting operation 22 and the depth assigning operation 23 as applied to the key frame. The tracking operation 24 may be bidirectionally implemented using a previous frame and a subsequent frame with respect to the key frame. In particular, corresponding objects in neighbor frames of the key frame are tracked in forward and backward directions of time with respect to the object extracted from the key frame.

As described above, a frame capable of maximizing accuracy and reliability of the 2D-3D conversion may be selected as the key frame, and the object extraction operation 22 and the depth assignment operation 23 are implemented with respect to the selected key frame. Further, the other frames are tracked with reference to the key frame. Therefore, it is possible to perform the conversion processes efficiently, with respect to both costs and time, while maintaining high quality.

In the rendering operation 25, an imaging process for completing a 3D image is performed with respect to each of the left-eye and right-eye frames which have been subjected to the depth assignment operation 23 and the tracking operation 24. For example, in the rendering operation 25, a process of filling a hole area caused by a shift of an object in a frame image, which is often referred to as "inpainting," may be performed.

At least one of the 2D-3D conversion processes according to the present exemplary embodiment may be carried out on the basis of information relating to contents and a development process of a scene of a frame to be processed (hereinafter, referred to as "storytelling information"). The storytelling information is information which is used for providing a 3D visual effect in response to a story development pertaining to the corresponding contents, in accordance with a content producer's intention. In this exemplary embodiment, the object extraction operation 22, the depth assignment operation 23, and the like processes may be performed on the basis of the storytelling information.

At least one process of the 2D-3D conversion processes according to the present exemplary embodiment may include a manual process performed in accordance with a user's input, and/or an automatic process performed in accordance with preset reference information. For example, in the object extraction operation 22, the depth assignment operation 23 and the like processes, some frames may be processed by manual processes and the other frames may be processed by automatic process.

In a manual process, a conversion process may be performed in response to input of a user (e.g., a developer who performs content conversion work). The content converting apparatus 1 may further include a user input unit 12, such as, for example, one or more of a keyboard, a mouse, a tablet, etc., for obtaining a user's input. In addition, the content converting apparatus 1 may further include a display unit 13, such as, for example, a monitor or the like, that displays an image undergoing the conversion process. To effectively receive a user's input, the content converting apparatus 1 may provide a graphical user interface (GUI, not shown), including one or more of an image of a processed frame, a predetermined input menu, etc. By using the GUI, a user can provide input for the conversion process through the input menu or the like of the GUI while viewing the image of the frame displayed on the display unit 13. For example, a user may provide input relating to an extraction of an object through the input menu or the like of the GUI while viewing the corresponding object contained in an image of a frame.

In an automatic process, the process may be carried out on the basis of the preset reference information. For example, in an exemplary embodiment, in the object extraction operation 22, the content converting apparatus 1 analyzes an image of a frame, and selects an object, for which a change in a pixel value at a boundary of the object is not less than a predetermined threshold value, as an object to be extracted. In particular, the reference information may include the threshold value of the change in the pixel value at the boundary of the object.

The 2D-3D conversion process may be performed in correspondence with a quality of 3D contents. The quality of the 3D contents may show a degree to which the manual process and the automatic process are respectively performed in the 2D-3D conversion process. For example, the object extraction operation 22 may be performed by the manual process upon half of the frames and by the automatic process upon the other half of the frames. The quality of the 3D contents may be characterized by a plurality of quality modes. In accordance with one quality mode selected from among the plurality of quality modes, the 2D-3D conversion process may be performed. The quality of the 3D contents may be determined in accordance with the kinds and formats of the 2D contents.

In addition, 3D-image quality enhancement may be further performed upon a frame which has been subjected to the rendering operation 25. The 3D-image quality enhancement may include, for example, one or more of contrast enhancement, detail enhancement, etc. As a result of the 3D-image quality enhancement, image quality enhancement may be achieved to optimize image quality in a display device when 3D contents are actually displayed.

Figure 3:
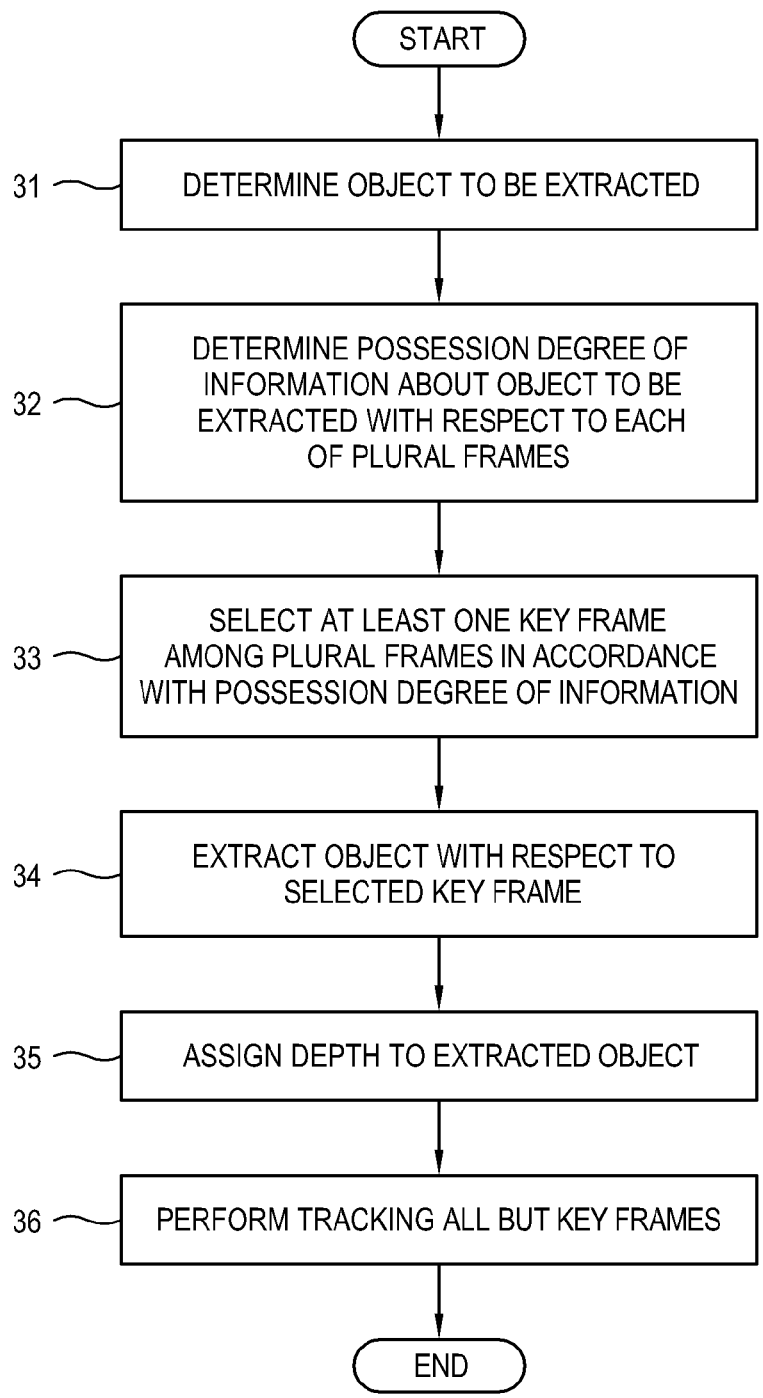
FIG. 3 is a flowchart showing an example of detailed operations of the content converting apparatus shown in FIG. 1.
Figure 4:
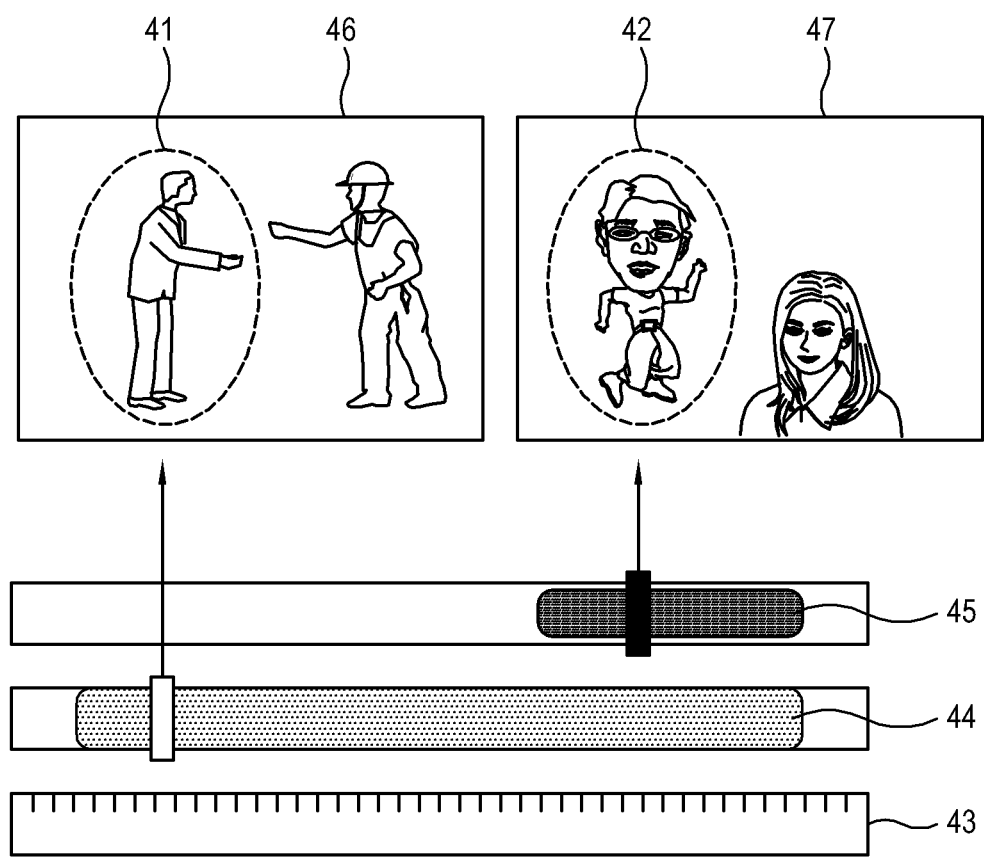
FIG. 4 shows an example of determining an object to be extracted by the content converting apparatus shown in FIG. 1.

FIG. 3 is a flowchart showing an example of detailed operations of the content converting apparatus shown in FIG. 1, according to an exemplary embodiment. First, at operation 31, the content converting apparatus 1 determines an object to be extracted among many objects included in frames being subjected to the conversion process. The object to be extracted may be determined from each scene of the 2D contents. In particular, an object determined as being important by taking contents of a corresponding scene into account may be determined as an object to be extracted. FIG. 4 shows an example of an object to be extracted in this exemplary embodiment. In FIG. 4, reference numeral 43 indicates a series of frames in chronological order, and reference numerals 46 and 47 indicate two frames (hereinafter, respectively referred to as a "first frame" and a "second frame") selected from the series of frames. The first frame 46 contains a first object 41, and the second frame 47 contains a second object 42. The first object 41 appears within a first scene 44, and is determined as being important among objects of the first scene 44. Thus, the first object 41 is determined as an object to be extracted. Likewise, the second object 42 appears within a second scene 45, and determined as being important among objects of the second scene 45. Thus the second object 42 is determined as an object to be extracted.

Referring back to FIG. 3, at operation 32, the content converting apparatus 1 determines a possession degree of information about an object to be extracted with respect to each of the plurality of frames containing the corresponding object. In particular, the content converting apparatus 1 determines how much each of the plurality of frames possesses information about the object to be extracted. The possession degree of information about the object to be extracted may be based on a shape of the object possessed in each frame. The shape of the object contained in each frame may be determined, for example, by analyzing a motion vector of the object in each frame.

Figure 5:
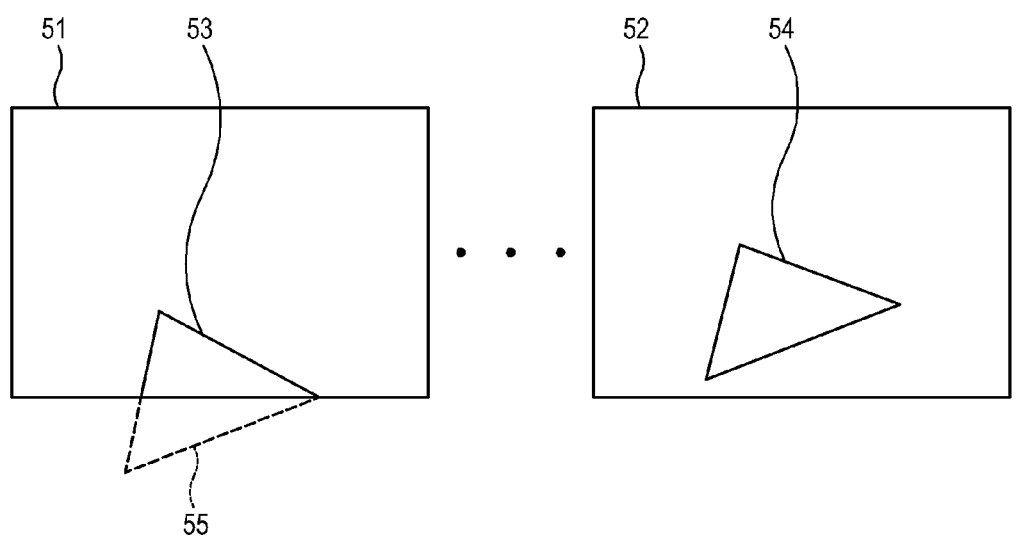
FIGS. 5 and 6 are views which illustrate criteria for determining a possession degree of information about an object to be extracted by the content converting apparatus shown in FIG. 1.
Figure 6:
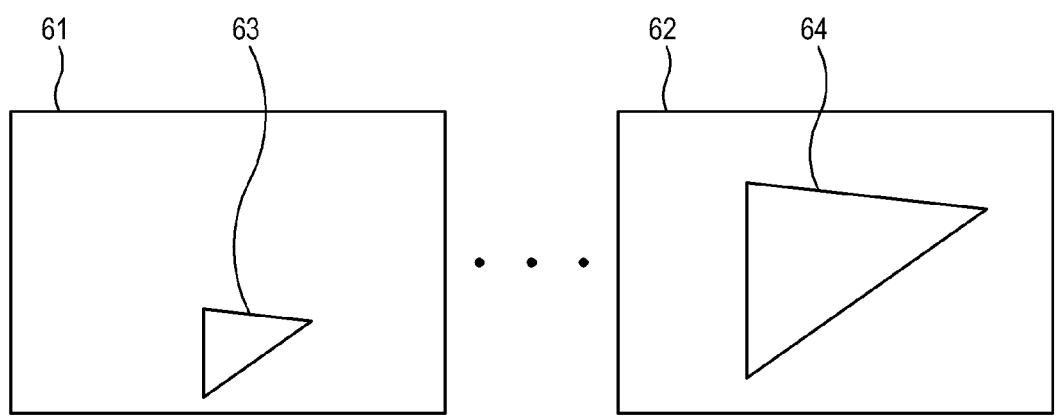

FIGS. 5 and 6 are views which illustrate criteria for determining a possession degree of information about an object to be extracted. In FIG. 5, reference numerals 51 and 52 respectively indicate two frames (hereinafter, referred to as a "first frame 51" and a "second frame 52") selected from among the plurality of frames possessing the object to be extracted. The first frame 51 possesses a first object 53, and the second frame 52 possesses a second object 54. The content converting apparatus 1 may determine that the possession degree of information varies with a degree of completeness of each of the shape of the object 53 and the shape of the object 54. In the example shown in FIG. 5, the first frame 51 contains only a part of the entire object 53, and does not contain the remainder, as indicated by reference number 55. By contrast, the second frame 52 contains the entirety of the object 54. Therefore, the content converting apparatus 1 may determine that the possession degree of information about the object of the second frame 52, which contains a complete version of the object 54, is higher than that of the first frame 51, which contains a partial version of the object 53.

Alternatively, in FIG. 6, reference numerals 61 and 62 respectively indicate two frames (hereinafter, referred to as a "first frame 61" and a "second frame 62") selected from among the plurality of frames possessing the object to be extracted. The first frame 61 possesses a first object 63, and the second frame 62 possesses a second object 64. The contents converting apparatus 1 may determine that the possession degree of information varies with a size of each of the shape of the object 63 and the shape of the object 64. In the example shown in FIG. 6, the second object 64 of the second frame 62 is bigger than the first object 63 of the first frame 61. Therefore, the content converting apparatus 1 may determine that the possession degree of information about the object of the second frame 62 is higher than that of the first frame 61, based on the relative difference in size between object 63 and object 64.

The content converting apparatus 1 may determine that an amount of variation of the possession degree of information based on the degree of completeness of the shape of the object is greater than an amount of variation of the possession degree of information based on the size of the object. For example, if the possession degree of information of the first frame 51 shown in FIG. 5 and possession degree of information of the first frame 61 shown in FIG. 6 are compared with each other, the possession degree of information of the first frame 61 shown in FIG. 6 may be determined to be higher than that the possession degree of information of the first frame 51 shown in FIG. 5, despite the fact that the object 53 is larger than the object 63, because the degree of completeness factor may be deemed to be more significant with respect to the possession degree of information, and because the object 63 is a complete version of the object, whereas the object 53 is a partial version of the object.

Referring back to FIG. 3, at operation 33, the content converting apparatus 1 selects at least one key frame from among the plurality of frames based on the determined possession degree of information about the object. For example, referring to FIG. 4, the content converting apparatus 1 may select one frame having the highest possession degree of information about the object as the key frame from among the plurality of frames. In some exemplary embodiments, the selected key frame is a frame having the most information about the object to be extracted.

Then, at operation 34, the content converting apparatus 1 extracts an object with regard to the selected key frame. At operation 35, the content converting apparatus 1 assigns a depth to the extracted object. At operation 36, the content converting apparatus 1 performs tracking upon all of the plurality of frames except for the at least one key frame.

Thus, in some exemplary embodiments, the optimum key frame, which has the most information about the object to be extracted, is selected for the purpose of tracking the object, so that the 2D-3D conversion can be performed with higher accuracy and reliability.

As described above, there are provided an apparatus and method for converting contents, in which 2D contents can be converted into 3D contents with higher accuracy and reliability.

Further, there are provided an apparatus and method for converting contents, in which a key frame may be optimally selected for the purpose of tracking a plurality of frames with higher accuracy and reliability.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A method of converting two-dimensional (2D) video contents into three-dimensional (3D) video contents by using a content converting apparatus, the method comprising:
    determining an object to be extracted from a plurality of frames which include 2 D contents;
    selecting at least one key frame from among the plurality of frames based on a degree of completeness of a shape of the object contained in the frame;
    extracting the object from the selected at least one key frame;
    assigning a depth for conversion into 3 D contents to the extracted object; and
    performing tracking upon all of the plurality of frames except for the selected at least one key frame.

2. The method according to claim 1, wherein the determining the object to be extracted comprises determining the object to be extracted from each scene included in the 2D contents.

3. The method according to claim 1, further comprising determining a respective possession degree of information about the object to be extracted based on a shape of the object contained in the corresponding frame.

4. The method according to claim 3, wherein the determining the respective possession degree of information comprises determining the respective possession degree of information to vary with a size of the shape of the object contained in the corresponding frame.

5. The method according to claim 3, wherein the determining the respective possession degree of information comprises determining the respective possession degree of information to vary with a degree of completeness and with a size of the shape of the object contained in the corresponding frame, wherein an amount of variation relating to the degree of completeness is greater than an amount of variation relating to the size.

6. The method according to claim 1, wherein the performing the tracking comprises performing the tracking bidirectionally using a previous frame and a subsequent frame with respect to a corresponding frame.

7. An apparatus for converting two-dimensional (2D) video contents into three-dimensional (3D) video contents, the apparatus comprising:
a communication unit;
a converter which:
determines an object to be extracted from a plurality of frames which include 2 D contents; selects at least one key frame from among the plurality of frames based on a degree of completeness of a shape of the object contained in the frame; extracts the object from the selected at least one key frame; assigns a depth for conversion into 3D contents to the extracted object; and performs tracking upon all of the plurality of frames except for the selected at least one key frame.

8. The apparatus according to claim 7, wherein the converter determines the object to be extracted from each scene included in the 2 D contents.

9. The apparatus according to claim 7, wherein the converter determines a respective possession degree of information about the object to be extracted based on a shape of the object contained in the corresponding frame.

10. The apparatus according to claim 9, wherein the converter determines the respective possession degree of information to vary with a size of the shape of the object contained in the corresponding frame.

11. The apparatus according to claim 10, wherein the converter determines the respective possession degree of information to vary with a degree of completeness and with a size of the shape of the object contained in the corresponding frame, wherein an amount of variation relating to the degree of completeness is greater than an amount of variation relating to the size.

12. The apparatus according to claim 7, wherein the converter performs the tracking bidirectionally using a previous frame and a subsequent frame with respect to a corresponding frame.

13. A non-transitory computer readable recording medium having recorded thereon a program executable by a computer, the program comprising computer code for performing each step recited in the method of claim 1.

* * * * *